(12) United States Patent
Santhoff et al.

(10) Patent No.: US 6,947,492 B2
(45) Date of Patent: Sep. 20, 2005

(54) ENCODING AND DECODING ULTRA-WIDEBAND INFORMATION

(75) Inventors: John H. Santhoff, Panama City Beach, FL (US); Rodolfo T. Arrieta, Panama City Beach, FL (US)

(73) Assignee: Pulse-LINK, Inc., Carlsbad, CA (US)

( * ) Notice: Subject to any disclaimer, the term of this patent is extended or adjusted under 35 U.S.C. 154(b) by 70 days.

(21) Appl. No.: 09/802,590

(22) Filed: Mar. 9, 2001

(65) Prior Publication Data

US 2004/0161052 A1 Aug. 19, 2004

(Under 37 CFR 1.47)

Related U.S. Application Data

(60) Provisional application No. 60/255,469, filed on Dec. 14, 2000.

(51) Int. Cl.[7] .................................................. H03K 7/04
(52) U.S. Cl. ........................................ 375/289; 375/239
(58) Field of Search ................................ 375/289, 287, 375/286, 239

(56) References Cited

U.S. PATENT DOCUMENTS

| 3,668,639 | A |   | 6/1972  | Harmuth ............... 340/166 R |
|-----------|---|---|---------|----------------------------------|
| 3,678,204 | A |   | 7/1972  | Harmuth ............... 179/15 BC |
| 3,961,203 | A | * | 6/1976  | Hutch ...................... 327/28 |
| 4,206,316 | A | * | 6/1980  | Burnsweig et al. ....... 375/239 |
| 4,506,267 | A |   | 3/1985  | Harmuth ................... 343/744 |
| 4,641,317 | A |   | 2/1987  | Fullerton .................... 375/1 |
| 4,651,152 | A |   | 3/1987  | Harmuth ................... 342/13 |
| 4,743,906 | A |   | 5/1988  | Fullerton .................. 342/27 |
| 4,813,057 | A |   | 3/1989  | Fullerton .................. 375/37 |
| 4,979,186 | A |   | 12/1990 | Fullerton .................. 375/23 |
| 5,134,408 | A |   | 7/1992  | Harmuth ................... 342/21 |
| 5,148,174 | A |   | 9/1992  | Harmuth ................... 342/21 |
| 5,153,595 | A |   | 10/1992 | Harmuth ................... 342/22 |
| 5,159,343 | A |   | 10/1992 | Harmuth ................... 342/22 |
| 5,166,890 | A | * | 11/1992 | Smischny ................ 717/704 |
| 5,307,081 | A |   | 4/1994  | Harmuth ................. 343/842 |
| 5,363,108 | A |   | 11/1994 | Fullerton ................. 342/27 |
| 5,365,240 | A |   | 11/1994 | Harmuth ................. 343/701 |
| 5,493,691 | A |   | 2/1996  | Barrett ..................... 455/20 |
| 5,523,758 | A |   | 6/1996  | Harmuth ................... 342/22 |
| 5,586,145 | A |   | 12/1996 | Morgan et al. .......... 375/239 |
| 5,592,177 | A |   | 1/1997  | Barrett .................... 342/361 |
| 5,610,907 | A |   | 3/1997  | Barrett .................... 370/342 |
| 5,677,927 | A |   | 10/1997 | Fullerton et al. ......... 375/200 |
| 5,687,169 | A |   | 11/1997 | Fullerton ................. 370/324 |
| 5,832,035 | A | * | 11/1998 | Fullerton ................. 375/149 |
| 5,862,141 | A | * | 1/1999  | Trotter .................... 370/468 |
| 5,901,172 | A |   | 5/1999  | Fontana et al. .......... 375/200 |
| 5,920,278 | A | * | 7/1999  | Tyler et al. ................ 342/33 |
| 6,031,862 | A |   | 2/2000  | Fullerton et al. ......... 375/200 |
| 6,163,873 | A | * | 12/2000 | Murano .................... 714/782 |

\* cited by examiner

*Primary Examiner*—Kevin Burd
(74) *Attorney, Agent, or Firm*—Pulse-LINK, Inc.

(57) ABSTRACT

A system and a method for encoding and decoding ultra-wideband information are provided. An ultra-wideband transmission is encoded by positioning bipolar pulse pairs. The bipolar pulse pairs assist in detecting errors in the ultra-wideband transmission, before the entire transmission has been received. The transmission is analyzed for errors and an error rate is calculated. The calculated error rate is compared to one or more predefined acceptable error rate levels to determine whether the calculated error rate of the transmission is within at least one of the predefined acceptable error rate levels.

2 Claims, 10 Drawing Sheets

ENCODING AND DECODING ULTRA-WIDEBAND INFORMATION

Priority is claimed from U.S. Provisional Patent Application Ser. No. 60/255,469, filed on Dec. 14, 2000, entitled "Ultra-Wideband Communication System and Method", which is incorporated herein by reference in its entirety.

FIELD OF THE INVENTION

The present invention generally relates to a system and a method of wireless communication and, more particularly, to a system and a system and method of ultra-wideband communication.

BACKGROUND OF THE INVENTION

Ultra-wideband transmission of information typically operates in highly populated frequency ranges. Typically, ultra-wideband communications (e.g., impulse radio communications) employ pulses of very short duration on the order of nanoseconds or picoseconds, for example. However, signals of such short duration often must contend with a variety of natural and synthetic noise signals resulting in signal cancellation, amplification or interference.

Furthermore, the transmission errors can be compounded by conventional encoding and decoding techniques. Conventional encoding and decoding techniques generally receive an entire transmission and then process (e.g., data type, decode) the transmission. After that conventional error detection processes (e.g., a check sum error algorithm) proceed. If after this error detection process, a transmission is found to have too many errors, then a request for a re-transmission of the entire transmission is required. This technique generally inefficient and time-intensive in detecting errors.

Accordingly, there is a need for a system or method of encoding and decoding an ultra-wideband transmission as part of an ultra-wideband communications system in which the method of encoding and decoding allows for the detection of errors and, if appropriate, the requesting for re-transmission before the complete transmission is received.

SUMMARY OF THE INVENTION

The present invention alleviates to a great extent the disadvantages of conventional apparatus and method of encoding and decoding transmitted information by providing a system and method for encoding and decoding ultra-wideband transmissions that detects errors in the transmission before the entire transmission is received.

In a preferred embodiment, the information transmission includes a plurality of information segments, which will be referred to as frames in this application. A frame preferably includes a positive timing window, a negative timing window, a bipolar pulse pair, where the bipolar pulse pair including a positive pulse and a negative pulse.

An ultra-wideband transmitting source is provided to transmit information over a plurality of frames, each frame having a known time duration. Each frame includes at least one bipolar pulse pair that comprises a positive pulse and a corresponding negative pulse. Each frame may be partitioned into a positive data window and a negative data window. The encoding of the transmission is achieved by positioning the positive pulse within the frame and, preferably, within the positive data window. To facilitate efficient error detection, the corresponding negative pulse is positioned within frame and preferably, within the negative data window. The relative position of the negative pulse in the negative data window is the same as the relative position of the positive pulse in the positive data window. Furthermore, the negative pulse has the same pulse width and an equal, but opposite, amplitude. Thus, if the transmission is corrupted by external signals, the negative pulse will no longer match the positive pulse. When a frame is received at a receiver, error detection occurs by correlating the positive pulse in the positive data window with the negative pulse in the negative data window. Thus, errors are counted on a per frame or per pulse pair basis. The error count provides an indication of the degree of degradation of the transmitted information. If the error count exceeds an error threshold, then the receiver requests that the transmitting source re-transmit the information. It is advantageous that an indication of the degree of degradation of the transmitted information is achieved before the transmission is entirely received.

The information can be subjected to data processing, after receiving a transmission and assuming that the error threshold has not been exceed (resulting in a request for re-transmission). For example, the transmission may be data typed (i.e., determining if the information is video information, audio information, data information or some combination thereof). In another aspect of the present invention, conventional error detection algorithms and, if appropriate, error correction algorithms may be applied. In yet another aspect of the present invention, an error rate is calculated. The calculated error rate may be useful in determining if the transmitted information is acceptably accurate and, thus, may be sent to the appropriate destination. Alternatively, the calculated error rate may indicate that the transmitted information is corrupted, but may be recovered via error correction remedies. Moreover, the calculated error rate may indicate that the information is so corrupted that the error correction remedies will not substantially improve the accuracy of the transmitted information. In this case, the transmitter is requested to re-transmit the information.

In one aspect of the invention, the method includes steps of transmitting a frame; generating a negative pulse to have an amplitude and a pulse width equal to an amplitude and a pulse width of the positive pulse; positioning the positive pulse in the positive timing window and the negative pulse in the negative timing window, the position of the negative pulse in the negative timing window corresponding to the position of the positive pulse in the positive timing window; receiving the positive pulse and the negative pulse; and, before receiving the complete transmission, correlating the received positive pulse and the received negative pulse in determining whether a correlation error has occurred in the transmission of the positive pulse.

In another aspect, the present invention further includes steps for, after receiving the pulse train, determining a data type of the ultra-wideband transmission and calculating an error rate for the ultra-wideband transmission; if the calculated error rate is less than a Typical Minimum Acceptable Bit Error Rate (TMABER) for the determined data type, then sending the ultra-wideband transmission to a desired destination; if the calculated error rate is greater than the TMABER and less than a Maximum Bit Error Rate For Correction (MBERFC) for the determined data type, then error correcting the ultra-wideband transmission before sending the ultra-wideband transmission to the desired destination; and, if the calculated error rate is greater than the MBERFC for the determined data type, then requesting the re-transmission of the ultra-wideband transmission.

In another aspect, a method is provided for encoding and decoding an ultra-wideband transmission. The method includes the steps of transmitting a pulse train including a plurality of bipolar pulse pairs, each bipolar pulse pair including a positive pulse and a negative pulse, each bipolar pulse pair being disposed in a frame, the frame including a positive timing window and a negative timing window; generating the negative pulse to have an amplitude and a pulse width equal to an amplitude and a pulse width of the positive pulse; and positioning the positive pulse in the positive timing window and the negative pulse in the negative timing window, the position of the positive pulse in the positive timing window encoding information within the frame, the position of the negative pulse in the negative timing window corresponding to the position of the positive pulse in the positive timing window.

In another aspect, a system is provided for detecting an error in a transmission in an ultra-wideband communications system in which the transmission includes a plurality of frames. The system includes means for transmitting a frame of the transmission. The frame includes a positive timing window and a negative timing window, and includes a bipolar pulse pair having a positive pulse and a negative pulse. The system also includes means for generating the negative pulse to have an amplitude and a pulse width equal to an amplitude and a pulse width of the positive pulse and means for positioning the positive pulse in the positive timing window and the negative pulse in the negative timing window in which the position of the negative pulse in the negative timing window corresponds to the position of the positive pulse in the positive timing window. In addition, the system provides means for receiving the positive pulse and the negative pulse and means for correlating the received positive pulse and the received negative pulse in determining whether a correlation error has occurred in the transmission of the positive pulse before receiving the complete transmission.

In yet another aspect, a system for encoding and decoding an ultra-wideband transmission is provided. The system includes means for transmitting a pulse train including a plurality of bipolar pulse pairs. Each bipolar pulse pair includes a positive pulse and a negative pulse and each bipolar pulse pair is disposed in a frame. The frame includes a positive timing window and a negative timing window. They system also includes means for generating the negative pulse to have an amplitude and a pulse width equal to an amplitude and a pulse width of the positive pulse and means for positioning the positive pulse in the positive timing window and the negative pulse in the negative timing window. The position of the positive pulse in the positive timing window encodes information within the frame. The position of the negative pulse in the negative timing window corresponds to the position of the positive pulse in the positive timing window.

These and other features and advantages of the present invention will be appreciated from review of the following detailed description of the invention, along with the accompanying figures in which like reference numerals refer to like parts throughout.

DETAILED DESCRIPTION OF THE INVENTION

When utilizing ultra-wideband pulse technology, typically not more than 10% of the available 1 ns pulse windows are available due to multi-path reflections and other physical constraints sometimes present in ultra-wideband technology. A 10% utilization of the available time windows results in a data rate or channel capacity of 100 Mbits per second, using 1 ns pulse windows. The remaining 90% of the pulse windows is not used and is therefore considered "inactive" due to these constraints. The challenge then becomes how to best utilize that 10% of "active" pulse windows. By using pulse position modulation ("PPM") in conjunction with these "inactive" windows, the inactive windows may be utilized to further define digital data, giving an increase in total bandwidth, with no associated increase in the "active" pulses emitted.

The present invention contemplates that, when using a non-resonant antenna to transmit ultra-wideband pulses, positive pulses emitted by the antenna have corresponding negative pulses emitted by the antenna which are equal and opposite to the positive pulses. In such a scheme, a positive pulse and a corresponding negative pulse would have equal pulse widths and amplitudes.

In addition, the present invention contemplates that the positive pulse is mirrored by the negative pulse, not only in amplitude and pulse width, but also in a time dimension. Such an arrangement provides the verification of data integrity on a pulse-by-pulse basis. Accordingly, the present invention provides for determining the degree of degradation present in a corrupt data set on a pulse-by-pulse basis.

A further determination of the degree of degradation present in the data set may be based on the type of data (e.g., audio data, video data, and document data), if the degree of degradation is considered acceptable, then the data might be passed on "as is". This decision may not be possible using a conventional checksum algorithm, because conventional algorithms generally are not equipped for identifying the degree or extent of the data error. In many cases, such as with audio and/or video data, for example, some bit loss may be acceptable. For example, typical minimum acceptable error bit error rates for video data may be approximately $10^{-5}$ BER, approximately $10^{-3}$ BER for audio data, and approximately $10^{-10}$ BER for document data. The ability to identify the degree of degradation provides additional options that would not otherwise be available under conventional error detection techniques (e.g., checksum).

Figure 1:
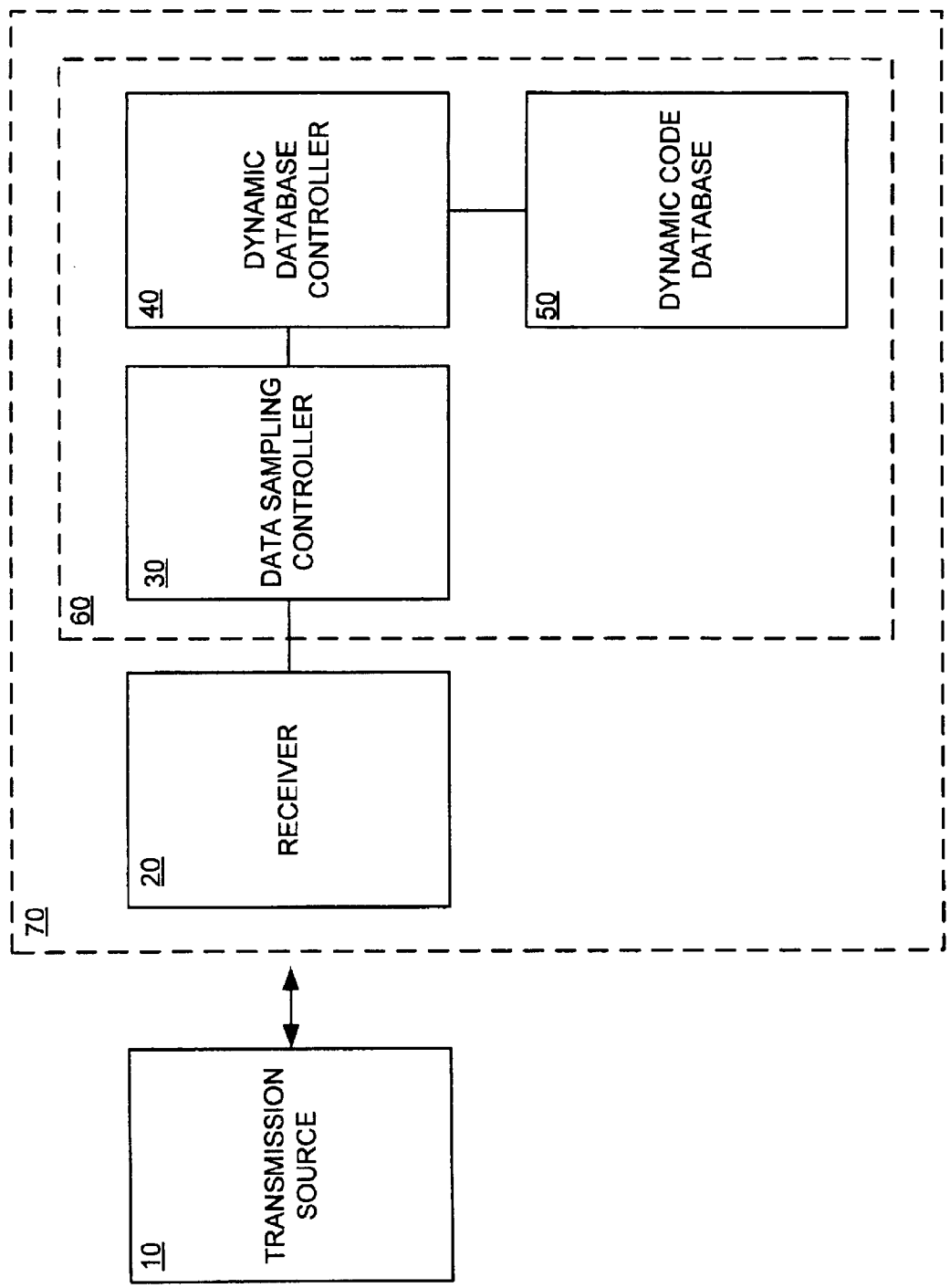
FIG. 1 shows a schematic representation of an embodiment of an ultra-wideband communications system according to the present invention.

FIG. 1 shows a schematic representation of an embodiment of an ultra-wideband communications system according to the present invention. A transmission source 10 is capable of two-way communication with a receiver 20. The transmission source 10 and the receiver 20 may represent at least one of a mobile unit, a plurality of coupled mobile units, a base station or a set of coupled base stations, for example. The receiver 20 is coupled to a data sampling controller (DSC) 30. The DSC 30 is coupled to a dynamic database controller (DDC) 40 which controls a dynamic code database (DCD) 50. The present invention also contemplates differing levels of integration including various combinations of the above elements. For example, the receiver 20 may include the DSC 30, the DDC 40 and the DCD 50 as indicated by box 70, or the DSC 30 may include the DDC 40 and the DCD 50 as indicated by box 60.

In operation according to an embodiment of the present invention, the transmission source 10 transmits an encoded impulse digital radio transmission. The encoded transmission is received by the receiver 20. The DSC 30 receives the encoded transmission and then processes the encoded transmission (e.g., determining the degree of data degradation, correcting the received data set, decoding the received data set, sending the data to the destination, noise mapping, and/or requesting a re-transmission of the received data set). The DDC 40 and the DCD 50 provide the DSC 30 with information relating to data types and acceptable quality parameters, for example.

Figure 2:
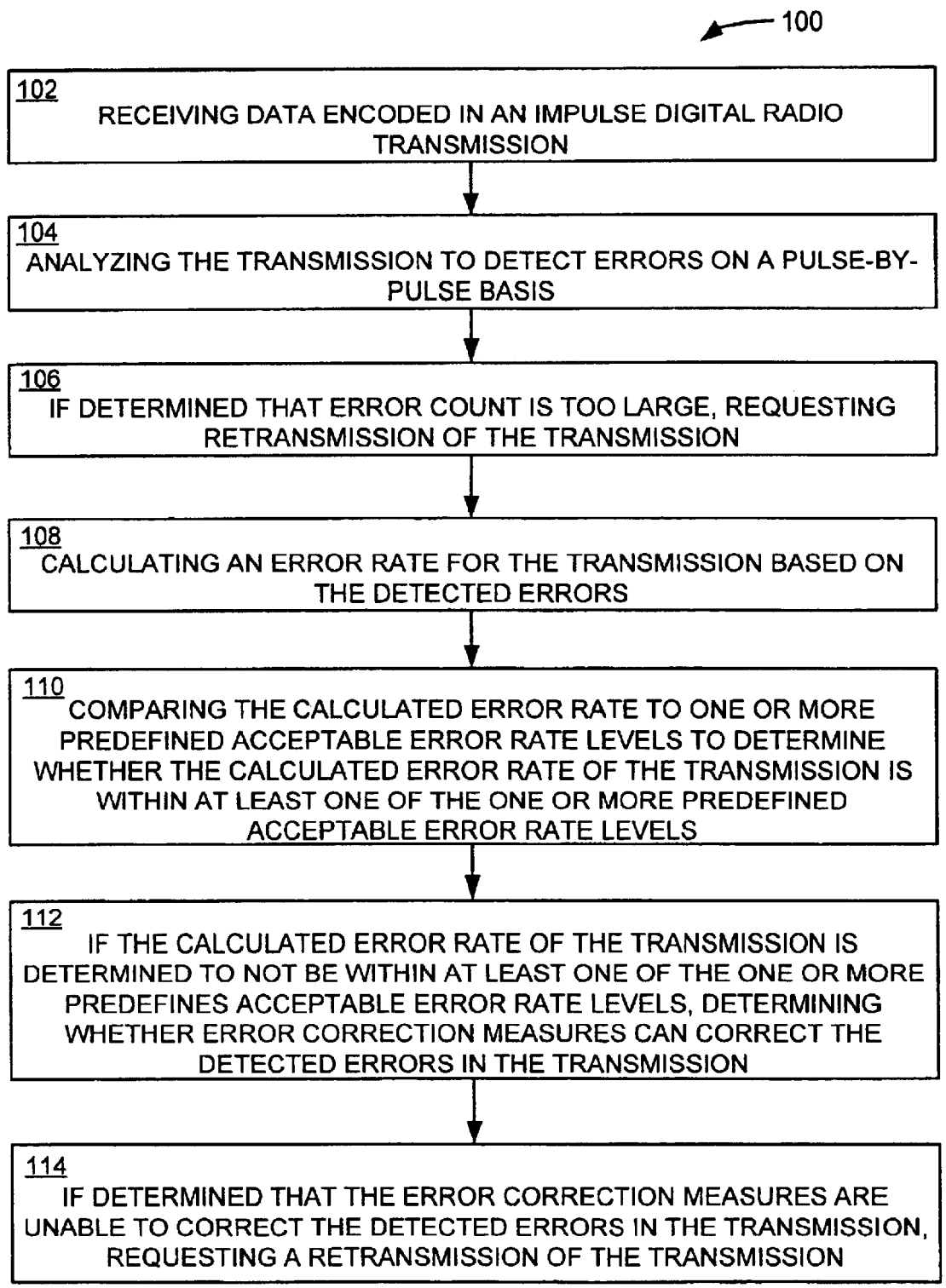
FIG. 2 shows a flowchart illustrating an embodiment of a process for detecting errors in an ultra-wideband communications system according to the present invention.

FIG. 2 shows a flowchart illustrating an embodiment of a process for detecting errors in an ultra-wideband communications system according to the present invention. In step 102, data encoded in an impulse digital radio transmission, for example, from the transmission source 10 is received using the receiver 20 (e.g., an impulse digital radio signal receiver). In one embodiment, the transmission is forwarded from the receiver 20 to the DSC 30. In step 104, the DSC 30 analyzes the transmission to detect and count errors in the transmission on a pulse-by-pulse basis. In step, 106, if the error count indicates that the transmission has too many errors, then the receiver 20 requests that the transmission source 10 retransmit the transmission. Step 106 has an advantage in that, before the entire data set has been received by the DSC 30, the DSC 30 can determine if retransmission is necessary. This is more responsive and efficient than conventional error detecting techniques (e.g., checksum techniques) which typically must first receive the entire data set before error analysis may commence. Next, in step 108, the DSC 30 determines the data type and calculates an error rate for the transmission based on the detected errors.

In step 110, the calculated error rate is compared by the DSC 30 to one or more predefined acceptable error rate levels to determine whether the calculated error rate of the transmission is within at least one of the predefined acceptable error rate levels. In one embodiment, the DSC 30 obtains information relating to the predefined acceptable error rate levels from the DCD 50 via the DDC 40. If the calculated error rate of the transmission is determined not to be within at least one of the one or more predefined acceptable error rate levels, then in step 112, the DSC 30 determines whether error correction measures can correct the detected errors in the transmission. If it is determined that the error correction measures are unable to correct the detected errors in the transmission, then a retransmission of the transmission is requested from the transmission source in step 114.

In some embodiments according to the present invention, the transmission may include a data set which includes a pulse train. Each pulse train includes a plurality of bipolar pulse pairs. Each bipolar pulse pair in the pulse train may define a frame having a bipolar pair of timing windows (i.e., a positive timing window and a negative timing window). Each timing window of a particular frame has a corresponding one of the pulses of the associated bipolar pulse pair positioned in it (i.e., the positive pulse is positioned in the positive timing window and the negative pulse is positioned in the negative window). Each timing window also includes a plurality of time bins or timing slots with each pulse of the associated bipolar pulse pair being positioned in one of the timing slots of the corresponding timing window at transmission. In such an aspect, the timing windows in each bipolar pair of timing windows may have equal numbers of timing slots and the pulses of the associated bipolar pulse pair may be positioned in timing slots having the same position in their respective timing window.

In an embodiment of the present invention, the error correction measures may be executed (e.g., by the DSC 30) to correct the detected errors in the transmission if the calculated error rate of the transmission is determined to be within at least one of the one or more predefined acceptable error rate levels. The error correction measures may also be executed by the DSC 30, for example, to correct the detected errors in the transmission if it is determined that the error correction measures can correct the detected errors in the transmission. The data encoded in the transmission may also be decoded.

The calculated error rate may include a bit error rate. Furthermore, information relating to the predefined acceptable error rate levels may be retrieved from a database (e.g., the DCD 50). The executing of error correction measures may also include applying at least one error correction algorithm to the received transmission to correct the detected errors in the received transmission.

To maintain data integrity in an ultra-wideband environment, a bipolar pulse position modulation technique may be employed. This technique is based on a bipolar data structure that encompasses a positive "data window" followed by a negative but otherwise identical data window. At the transmitter, a pulse placed in the positive data window may be complemented by a pulse placed in the negative window. This one-to-one correspondence of positive and negative pulses allows a basic level of error checking to be done at the receiver on a pulse per pulse basis. Thus, in an embodiment according to the present invention, the transmission may comprise a pulse train that comprises a plurality of bipolar pulse pairs.

Figure 3:
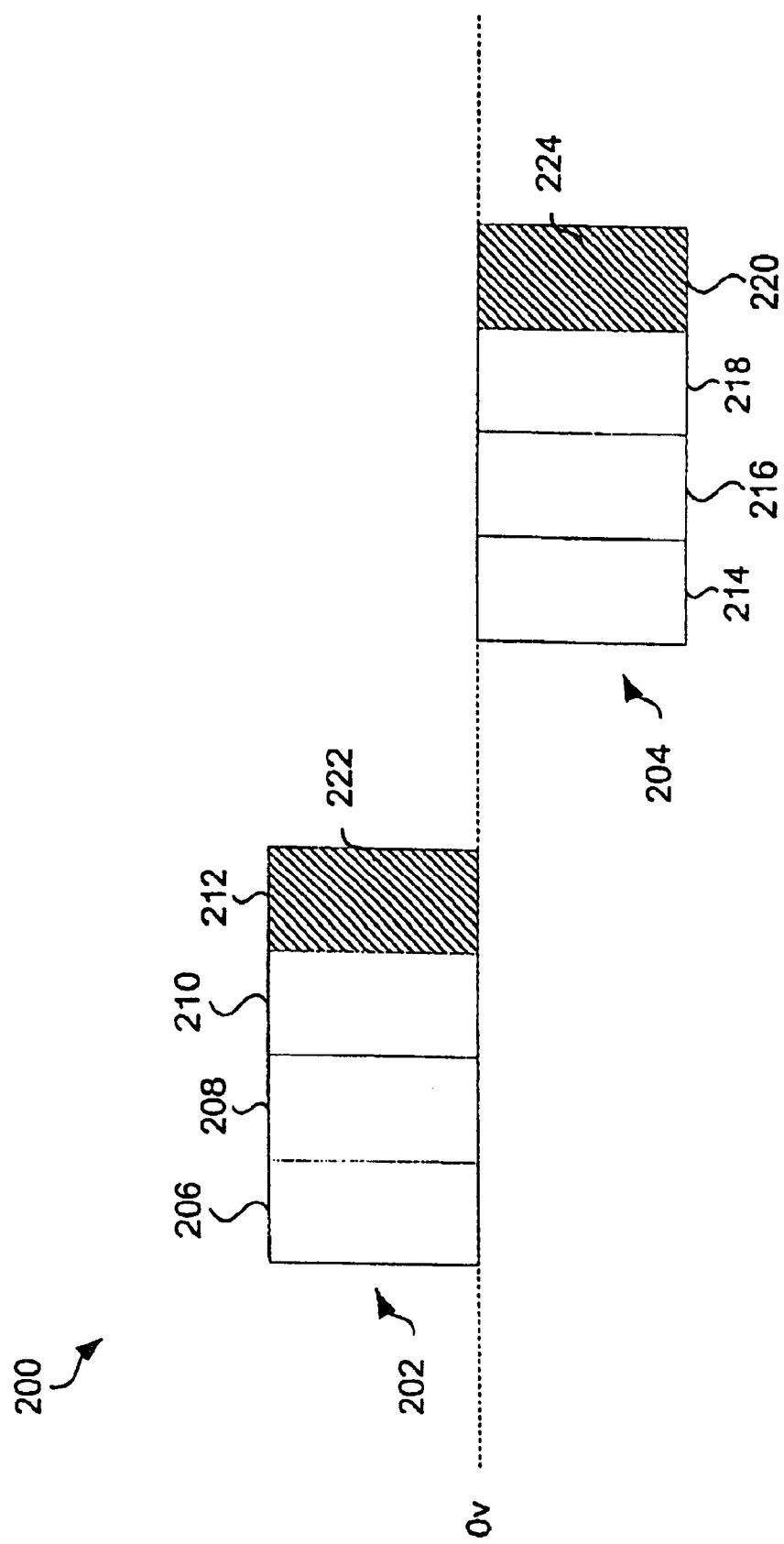
FIG. 3 shows a schematic representation of an embodiment of a bipolar pulse pair according to the present invention.

FIG. 3 shows a schematic representation of an embodiment of a bipolar pulse pair according to the present invention. A bipolar pulse pair includes a positive pulse 212 and a corresponding negative pulse 224 in which the corresponding negative pulse 224 may be used in detecting if an error occurs during the transmission of the positive pulse 212. Each bipolar pulse pair in the pulse train may form a frame 200 having a bipolar pair of timing windows 202, 204, which may also be referred to as "data windows", (e.g., a positive timing window 202 and a negative timing window 204). Each timing window includes a plurality of timing slots 206, 208, 210, 212, 214, 216, 218, 220. In an exemplary embodiment, both the positive and negative timing windows may each comprise four timing slots. Also, the timing slots may be of equal and precise width. Typically, the time width of each timing slot may range between approximately 10 ps and approximately 100 ns. In one exemplary embodiment, the time width is approximately 1 ns.

Figure 10:
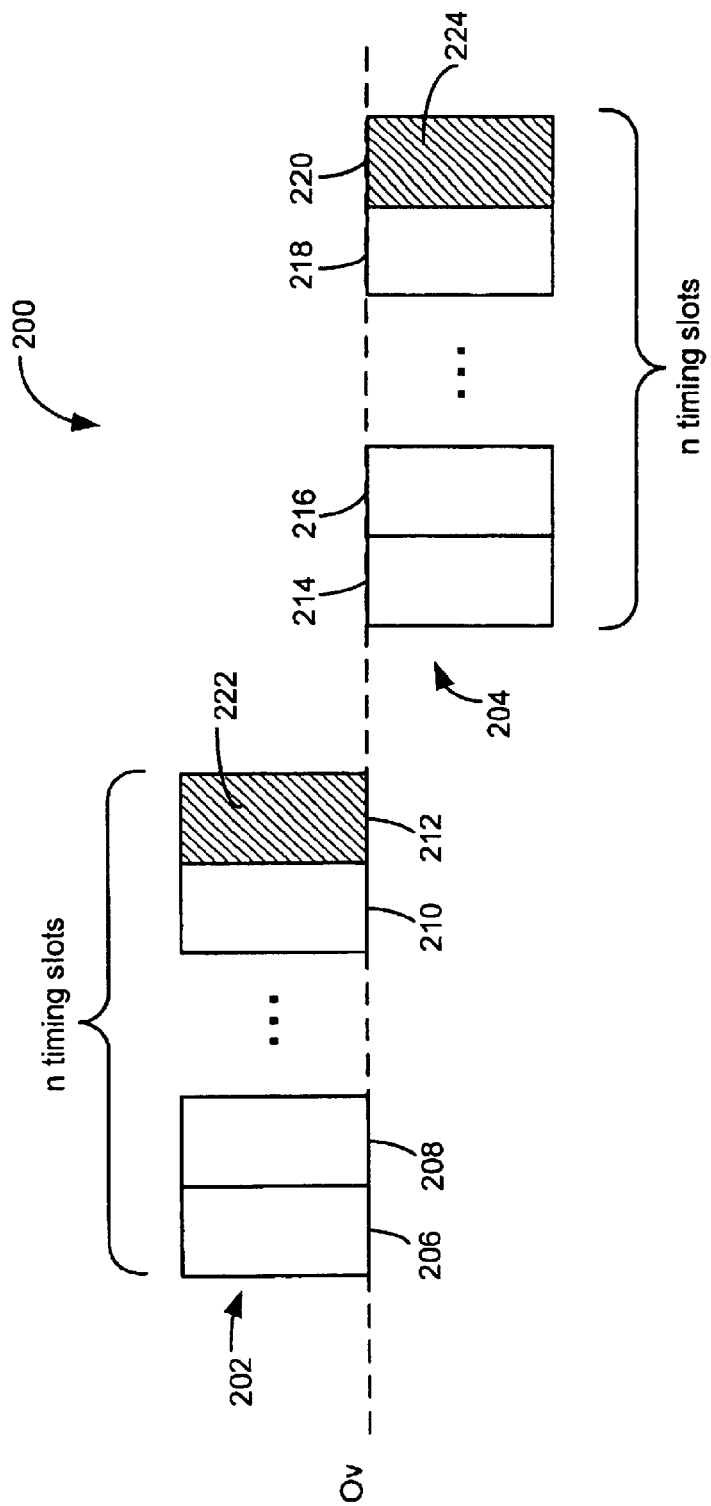
FIG. 10 shows a schematic representation of an embodiment of a bipolar pulse pair according to the present invention.

Although FIG. 3 shows a time space between timing slot 212 and timing slot 214, the present invention also contemplates that there is no time space between the timing slots 212, 214. Furthermore, although FIG. 3 illustrates the concept of bipolar multi-slotted data windows including 4 timing slots each, the present invention also contemplates multi-slotted data windows including other quantities of times slots. FIG. 10 illustrates the concept of bipolar multi-slotted data windows, each including n time slots. The number of time slots used can be varied depending upon the particular application and the corresponding timing constraints.

Each timing window of a particular frame has a corresponding one of the pulses of the associated bipolar pulse pair positioned in it. For example, a positive pulse 222 of the bipolar pulse pair is positioned in the positive timing window 202 and a negative pulse 224 of the bipolar pulse pair is positioned in the negative timing window 204. At transmission, the pulses are each positioned in one of the timing slots of the respective timing window. For example, the pulses of the associated bipolar pulse pair are positioned in timing slots having the same position in their respective timing window. This may be accomplished by placing a negative pulse in the equivalent slot position in the negative window as the slot position of the positive pulse in the positive window. For example, at transmission, a positive pulse 222 may be positioned in the fourth timing slot 212 of the positive timing window 202 (which is shaded to represent the position of the positive pulse in FIG. 3). Therefore, at transmission, the corresponding negative pulse 224 is positioned in the fourth timing slot 220 of the negative timing window 204 (which is also shaded to represent the position of the negative pulse).

Although FIG. 3 illustrates an embodiment in which the positive pulse is transmitted before the corresponding negative pulse, the present invention also contemplates that the corresponding negative pulse can be transmitted first. Additionally, although FIG. 3 illustrates an embodiment in which the corresponding negative pulse is used in determining an error in the positive pulse, the present invention also contemplates that a corresponding positive pulse may be used in determining an error in the negative pulse.

Although FIG. 3 illustrates the negative pulse 224 positioned in an equivalent timing slot 224 as the timing slot 212 in which the positive pulse 222 is positioned, the present invention also contemplates other positioning schemes. Accordingly, other mappings (e.g., other one-to-one mappings) between timing slots in the positive timing window 202 and the timing slots in the negative timing window 204 may be implemented.

The amount of information a pulse transmits may be based on the pulse position in the timing window. Positioning a pulse within a four-slot window, for example, allows transmission of one of four distinct symbols (equivalent to two bits of digital information). For example, if the pulse resides in the first time slot of a timing window (e.g., timing slots 206 or 214) the data pulse represents a binary value of 00; if the pulse resides in the second time slot of a timing window (e.g., timing slots 208 or 216), the data pulse represents a binary value of 01; if the pulse resides in the third timing slot (e.g., timing slots 210 or 218), the data pulse represents a binary value of 10; and, if the pulse resides in the fourth timing slot (e.g., timing slots 212 or 220), the data pulse represents a binary value of 11.

Detection of these bipolar-pulse sequences may be accomplished on a slot-by-slot review of the positive and complimentary negative windows. Each negative timing window provides a direct verification of the pulse position in the preceding positive timing window. The exemplary bipolar pulse pair illustrative FIG. 3 may be used to demonstrate the scenario where, at receipt, no error is detected. In particular, since the positions of the pulses are in the corresponding slots of the positive and negative timing windows, their correlation indicates that there are no errors in pulse positioning.

The redundancy provided by the bipolar multi-slotted time windows allows the receiver to check for data integrity using several methods. For instance, if either the positive or the negative pulse is missing or not in the equivalent corresponding time slot, then an error exists in the transmission. Another type of error involves the occurrence of more than one pulse in either the positive or negative data windows. If an error is detected the data is not necessarily discarded. The DSC 30 continues to process the data by performing error correction algorithms.

Figure 4:
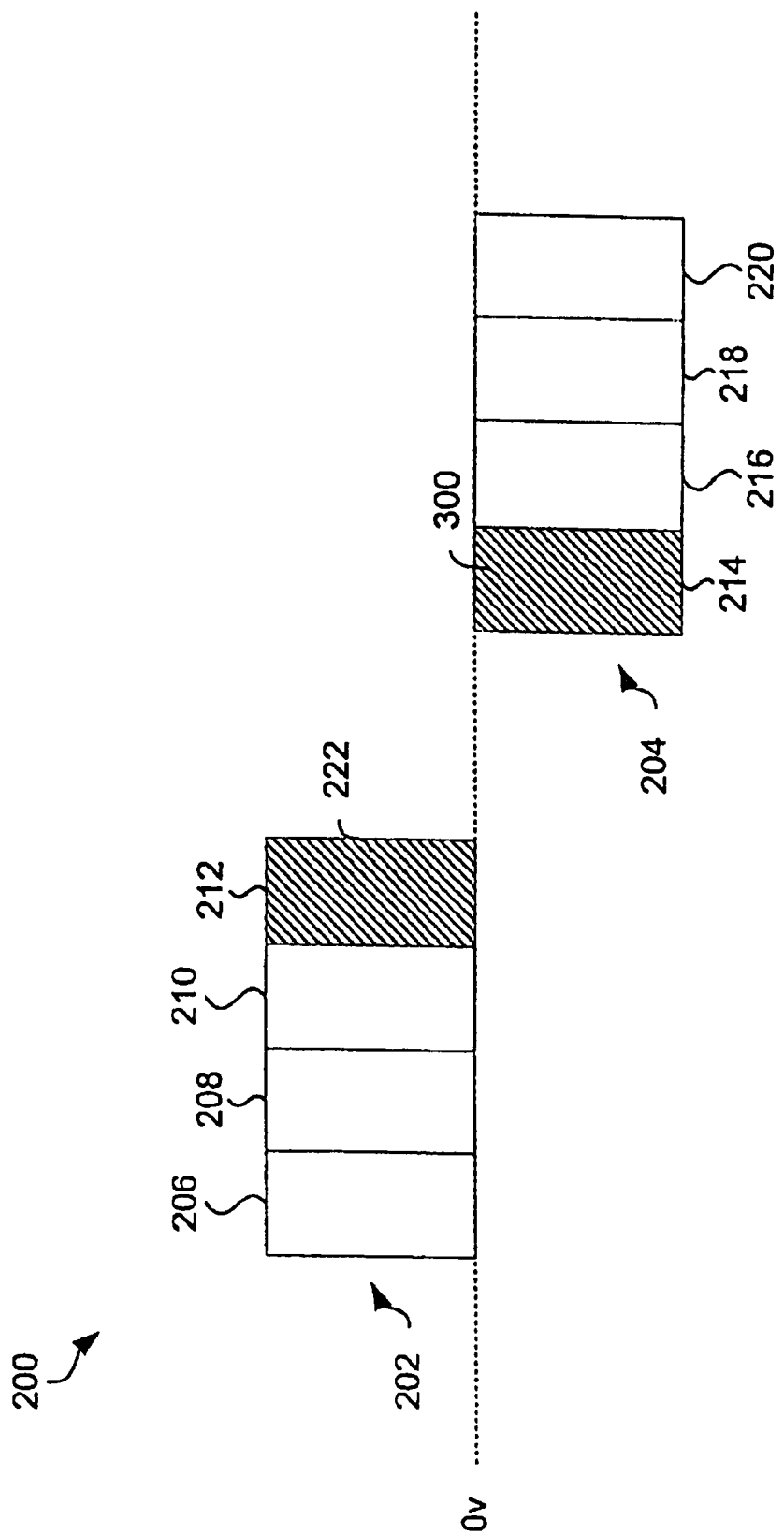
FIG. 4 shows a schematic representation illustrating an example of a detected pulse positioning error according to the present invention.

FIG. 4 shows a schematic representation illustrating an example of a detected pulse positioning error according to the present invention. A pulse positioning error is illustrated in which the positive pulse 222 is positioned in the fourth timing slot 212, but the corresponding negative pulse 300 is positioned in the first timing slot 214. Such an error may be caused, for example, by a clock mismatch between the receiver and the transmitter or burst noise (e.g., possibly from other ultra-wideband transmitters, synthetic or natural sources).

Figure 5:
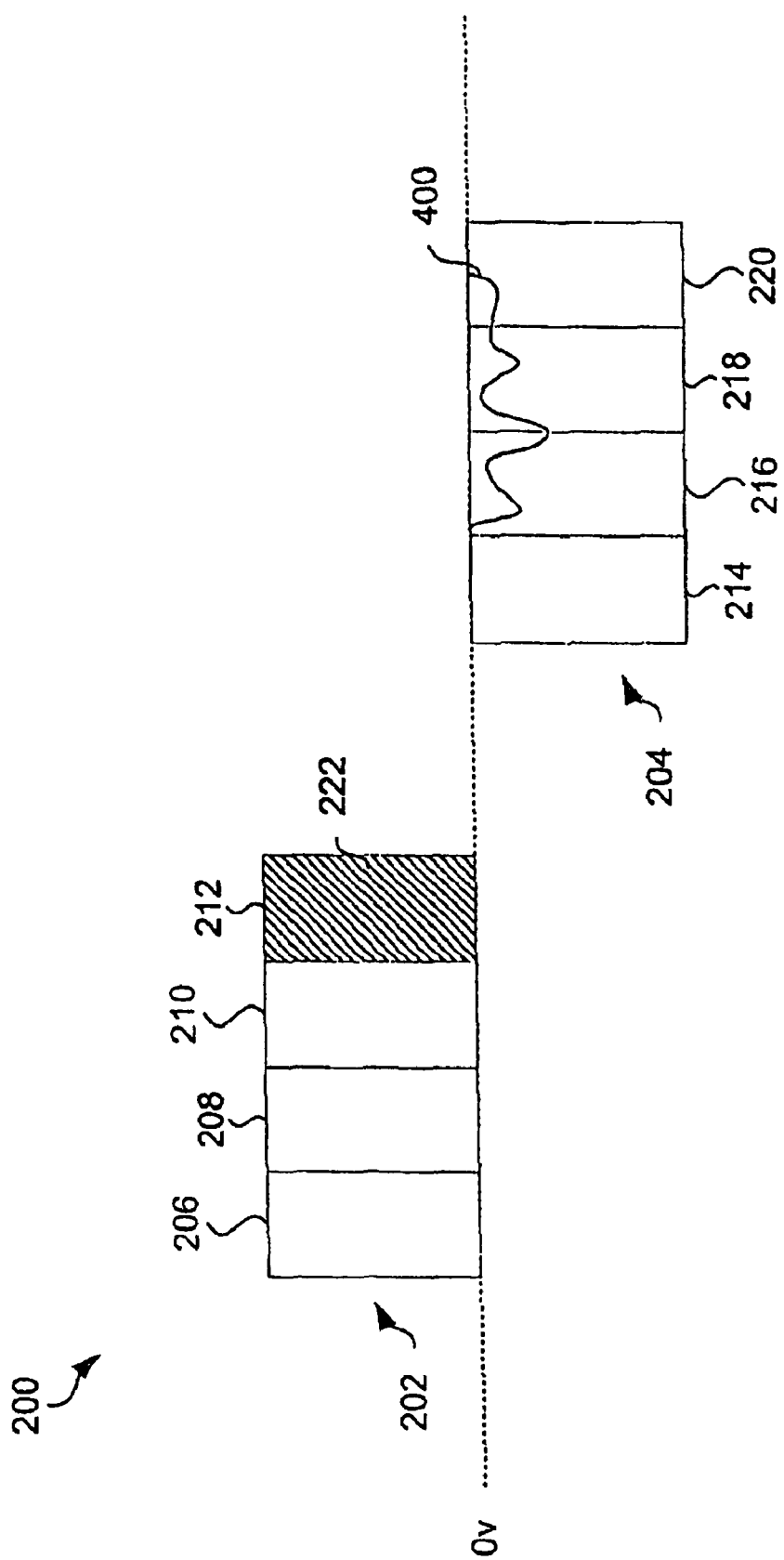
FIG. 5 shows a schematic representation illustrating an example of a pulse distortion error according to the present invention.

FIG. 5 shows a schematic representation illustrating an example of a pulse distortion error according to the present invention. A pulse distortion error 400 may be caused by absorption and multipath problems. The illustrated negative window 204 has a distortion error 400 which spans several of the timing slots and indicates a distortion error.

Figure 6:
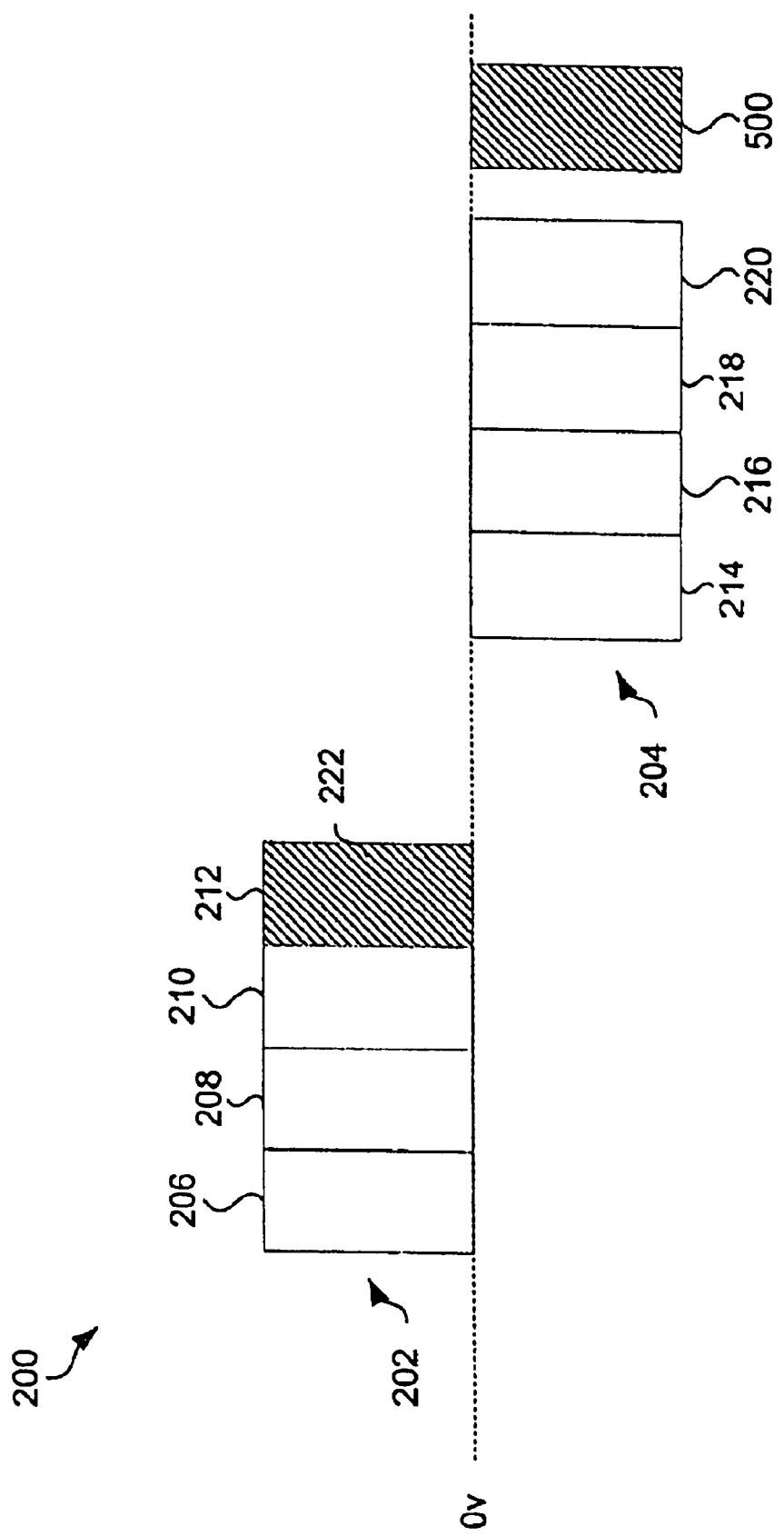
FIG. 6 shows a schematic representation illustrating an example of a missing negative pulse error according to the present invention.
Figure 7:
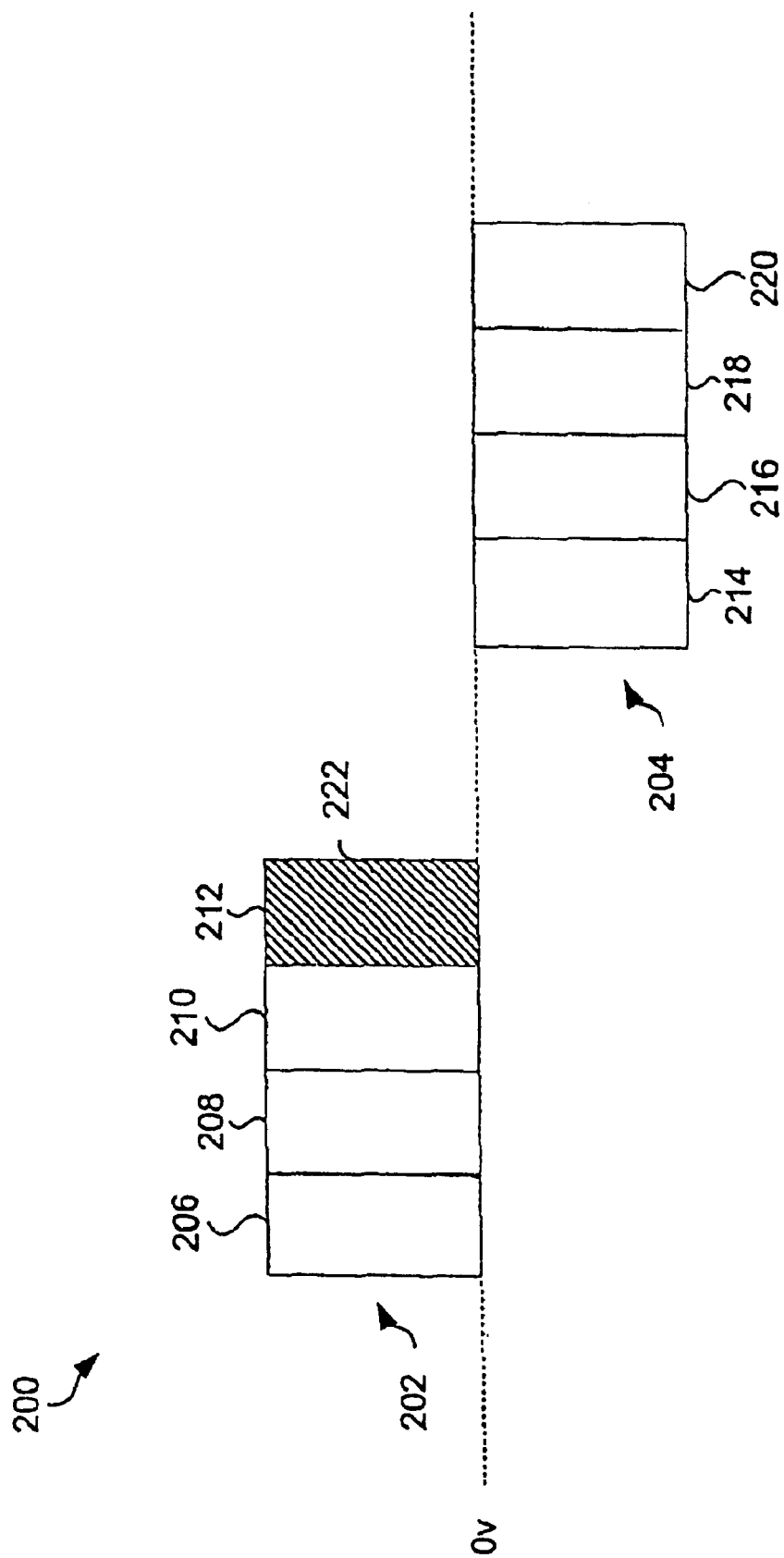
FIG. 7 shows a schematic representation illustrating another example of a missing negative pulse error according to the present invention.

FIG. 6 shows a schematic representation illustrating an example of a missing negative pulse error according to the present invention. A missing negative pulse error is illustrated in which the negative pulse 500 is no longer positioned in the negative timing window 204. The missing negative pulse error may be caused, for example, by exact in phase cancellation (e.g., by other ultra-wideband devices) or clock mismatches between transmitter and receiver. This type of error is similar to the error illustrated in FIG. 4 except that the "fake" pulse does not fall within the negative window but rather outside the window. FIG. 7 shows a schematic representation illustrating another example of a missing negative pulse error according to the present invention. The missing negative pulse error may have possibly be the result of phase cancellation, for example.

Figure 8:
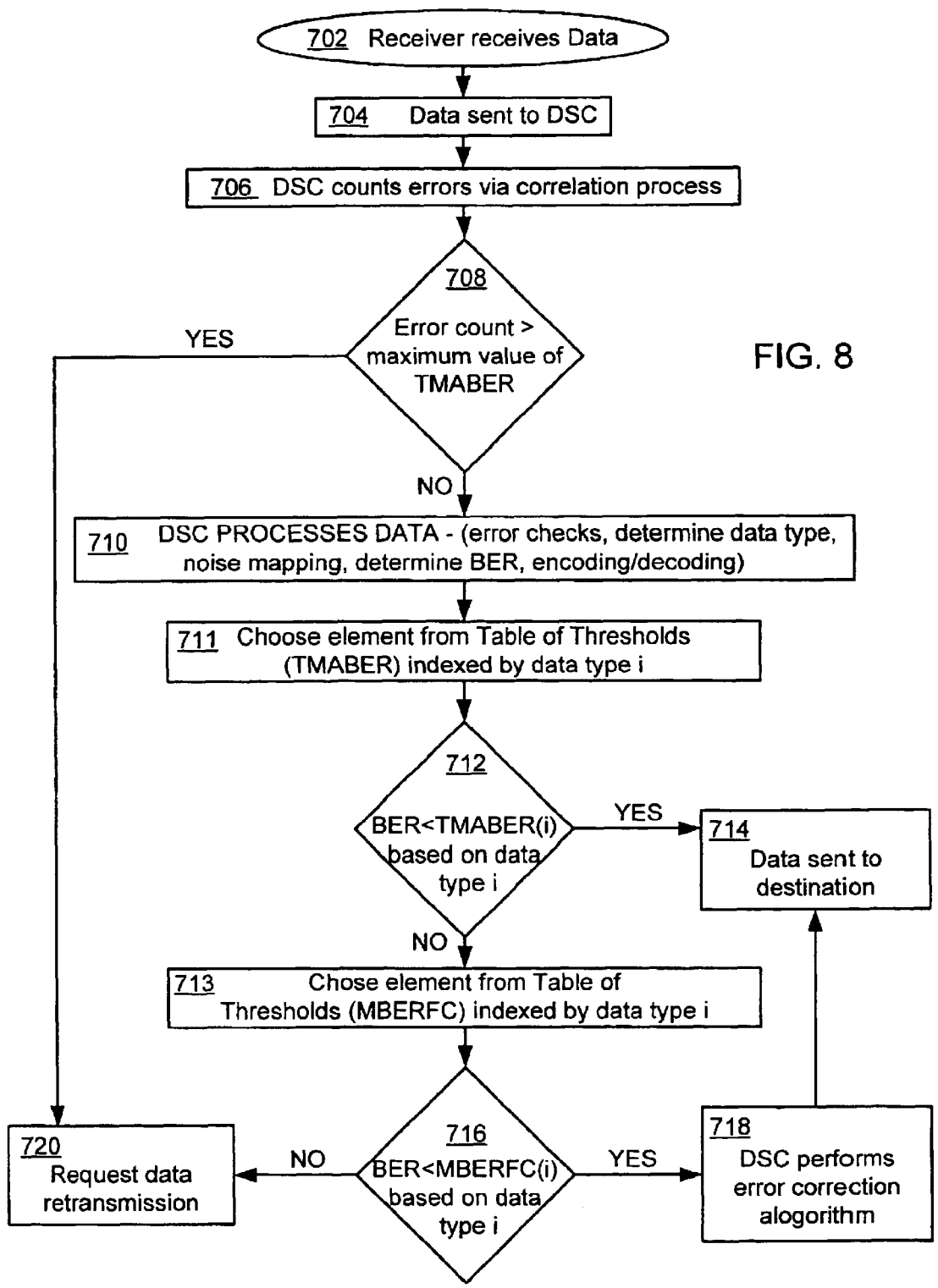
FIG. 8 shows a flowchart illustrating an embodiment of an error decoding process in an ultra-wideband communications system according to the present invention.

FIG. 8 shows a flowchart illustrating an embodiment of an error decoding process in an ultra-wideband communications system according to the present invention. A process 700 is shown illustrating general steps from the time that data is received by the ultra-wideband receiver 702 (see step 702). In step 704, after the data is received by the ultra-wideband receiver 20, it is sent to the DSC 30. In step 706, the DSC 30 performs an error count by correlating on a pulse-by-pulse basis, for example, the positive timing window including the positive pulse to the negative timing window including the negative pulse. This correlation function may be achieved via conventional techniques and using hardware implementations, software implementations or a combination thereof. The result of the correlation between the negative pulse and the positive pulse of a bipolar pulse pair, for example, can be compared to a correlation threshold in determining whether an error is present in the bipolar pulse. In step 708, if there is an accumulation of a threshold level of errors in a given transmission, then this is an indication that the transmission is corrupted. In an exemplary embodiment, the threshold value is a value (e.g., maximum value) in a table, for example, including Typical Minimum Acceptable Bit Error Rates (TMABERs). Accordingly, in step 720, if the transmission is corrupted, then a request is made to the transmitting source to re-transmit the corrupted transmission. This is advantageous in that the entire transmission need not be received before a determination is made that the transmission is corrupted and must be re-transmitted.

If the transmission is received without the error count exceeding the error threshold, then the DSC 30, in step 710, performs a number of error checks on the received data set. For example, the DSC 30 may determine the data type and calculate a Bit Error Rate (BER). In step 711, the DSC 30 chooses a particular value from the table of TMABERs based on the determined data type. In step 712, the DSC 30 compares the calculated BER against the value from the table of TMABERs which, for example, indexed according to data type. If the calculated BER is less than the TMABER for the determined data type, then the data is sent to its destination as set forth in step 714. If the BER is greater than the TMABER for the determined data type, then the DSC 30 determines if the data can be corrected using the data correction algorithms as set forth in step 716. In step 716, if the calculated BER is less than the corresponding value in the table, for example, of Maximum Bit Error Rates For Correction (MBERFC) which is, for example, indexed according to data type, then the DSC 30 processes the data set using a conventional technique of error correction as set forth in step 718; subsequently, in step 714, the data is sent to its destination. In step 716, if the calculated BER is greater than the corresponding value in the table of MBERFC, then the corruption of the data set is beyond what the conventional error correction techniques can remedy; accordingly, a request for re-transmission is sent to the transmission source as indicated in step 720.

In one embodiment according to the present invention, the DCD 50 stores information relating to threshold values, data types and other information relating to the transmissions. The DSC 30 accesses the information in the DCD 50 via the DDC 40.

Figure 9:
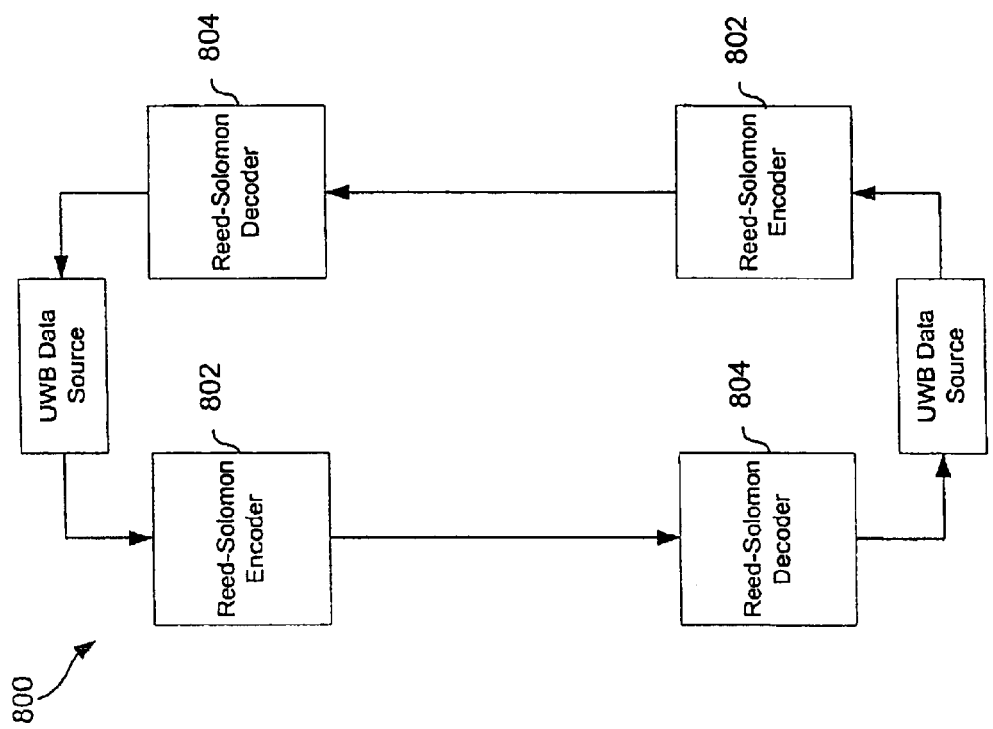
FIG. 9 shows a schematic block diagram of an embodiment of an error correction decoder in an ultra-wideband communications system according to the present invention.

FIG. 9 shows a schematic block diagram of an embodiment of an error correction decoder 800 according to the present invention. To maintain data integrity, conventional error correction methods (e.g., Reed-Solomon, Viterbi, etc.) are employed using one of several standard algorithms and their variants. Conventional error correction techniques can involve hardware, embedded software or a combination thereof. In FIG. 9, a Reed-Solomon encoder 802 takes a block of digital data and then adds checksum bits. The decoder 804 verifies data integrity and identifies corrupted data blocks and performs correcting and recovery actions as required to restore data integrity to the data blocks.

Thus, it is seen that a system and a method for encoding and decoding an ultra-wideband transmission are provided. One skilled in the art will appreciate that the present invention can be practiced by other than the preferred embodiments which are presented in this description for purposes of illustration and not of limitation, and the present invention is limited only by the claims that follow. It is noted that equivalents for the particular embodiments discussed in this description may practice the invention as well.

What is claimed is:

1. A method for detecting an error in a transmission in an ultra-wideband communications system, the transmission including a plurality of frames, comprising the steps of:

transmitting a frame of the transmission, the frame including a positive timing window and a negative timing window, the frame including a bipolar pulse pair, the bipolar pulse pair including a positive pulse and a negative pulse;

generating the negative pulse to have an amplitude and a pulse width equal to an amplitude and a pulse width of the positive pulse;

positioning the positive pulse in the positive timing window and the negative pulse in the negative timing window, the position of the negative pulse in the negative timing window corresponding to the position of the positive pulse in the positive timing window;

receiving the positive pulse and the negative pulse;

before receiving a complete transmission, correlating the received positive pulse with the received negative pulse in determining whether a correlation error has occurred in the transmission of the positive pulse;

after receiving at least one positive pulse and at least one negative pulse, determining a data type of the ultra-wideband transmission and calculating an error rate for the ultra-wideband transmission;

if the calculated error rate is less than a Typical Minimum Acceptable Bit Error Rate (TMABER), then sending the ultra-wideband transmission to a desired destination;

if the calculated error rate is greater than the TMABER and less than a Maximum Bit Error Rate For Correction (MBERFC), then error correcting the ultra-wideband transmission before sending the ultra-wideband transmission to the desired destination; and if the calculated error rate is greater than the MBERFC, then requesting the re-transmission of the ultra-wideband transmission.

2. A method for encoding and decoding an ultra-wideband transmission, comprising the steps of:

transmitting an ultra-wideband pulse train including a plurality of bipolar pulse pairs, each bipolar pulse pair including a positive pulse and a negative pulse, each bipolar pulse pair being disposed in a frame, the frame including a positive timing window and a negative timing window;

generating the negative pulse to have an amplitude and a pulse width equal to an amplitude and a pulse width of the positive pulse;

positioning the positive pulse in the positive timing window and the negative pulse in the negative timing window, the position of the positive pulse in the positive timing window encoding information within the frame, the position of the negative pulse in the negative timing window corresponding to the position of the positive pulse in the positive timing window;

receiving the positive pulse and the negative pulse;

before completely receiving the ultra-wideband pulse train, correlating the received positive pulse with the received negative pulse in determining whether a correlation error has occurred in the transmission of the received bipolar pulse pair;

counting the number of correlation errors in a portion of the ultra-wideband transmission;

if the number of correlation errors exceeds a particular threshold, then requesting the re-transmission of the ultra-wideband transmission;

after completely receiving the ultra-wideband pulse train, determining a data type of the ultra-wideband transmission and calculating an error rate for the ultra-wideband transmission;

if the calculated error rate is less than a Typical Minimum Acceptable Bit Error Rate (TMABER), then sending the ultra-wideband transmission to a desired destination;

if the calculated error rate is greater than the TMABER and less than a Maximum Bit Error Rate For Correction (MBERFC), then error correcting the ultra-wideband transmission before sending the ultra-wideband transmission to the desired destination; and if the calculated error rate is greater than the MBERFC, then requesting the re-transmission of the ultra-wideband transmission.

* * * * *